(12) United States Patent
Yagi et al.

(10) Patent No.: US 7,236,959 B2
(45) Date of Patent: Jun. 26, 2007

(54) METHOD FOR COLLECTIVELY RECEIVING AT HIGH VOLTAGE AND DISTRIBUTING AT LOW VOLTAGE, AND COLLECTIVE HOUSING USING SAME

(75) Inventors: Hirosato Yagi, Ikoma (JP); Takeo Ishida, Hirakata (JP); Ryuzo Hagihara, Kadoma (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 365 days.

(21) Appl. No.: 09/987,902

(22) Filed: Nov. 16, 2001

(65) Prior Publication Data

US 2002/0062293 A1    May 23, 2002

(30) Foreign Application Priority Data

Nov. 17, 2000    (JP) ............................. 2000-351848

(51) Int. Cl.
G06F 17/00    (2006.01)
G06Q 40/00    (2006.01)

(52) U.S. Cl. ........................................ 705/412; 705/37
(58) Field of Classification Search .................... 705/1, 705/7, 8, 10, 11, 26, 400, 412, 63, 37; 700/286–291, 700/295, 296, 297, 83, 17; 307/126, 20, 307/57
See application file for complete search history.

(56) References Cited

U.S. PATENT DOCUMENTS

| | | | |
|---|---|---|---|
| 4,218,737 A * | 8/1980 | Buscher et al. ................ 702/62 |
| 5,479,358 A * | 12/1995 | Shimoda et al. ............. 700/291 |
| 5,621,654 A * | 4/1997 | Cohen et al. ................ 700/287 |
| 5,705,862 A * | 1/1998 | Lutz et al. ................... 307/147 |
| 5,794,212 A * | 8/1998 | Mistr, Jr. ..................... 705/26 |
| 6,018,690 A * | 1/2000 | Saito et al. ................. 700/295 |
| 6,055,504 A * | 4/2000 | Chou et al. .................... 705/1 |
| 6,067,483 A * | 5/2000 | Fesmire et al. ............. 700/296 |
| 6,292,717 B1 * | 9/2001 | Alexander et al. .......... 700/293 |
| 6,473,744 B1 * | 10/2002 | Tuck et al. .................. 705/412 |
| 6,522,955 B1 * | 2/2003 | Colborn ...................... 700/286 |
| 6,526,516 B1 * | 2/2003 | Ishikawa et al. ............ 713/340 |
| 6,553,418 B1 * | 4/2003 | Collins et al. .............. 709/224 |
| 6,618,709 B1 * | 9/2003 | Sneeringer ................. 705/412 |
| 6,636,784 B1 * | 10/2003 | Tanner et al. ............... 700/287 |
| 6,681,156 B1 * | 1/2004 | Weiss .......................... 700/291 |
| 2005/0102215 A1 * | 5/2005 | Ausubel et al. ............... 705/37 |

FOREIGN PATENT DOCUMENTS

JP    40109713 A  *  4/1989

* cited by examiner

*Primary Examiner*—Igor N. Borissov
(74) *Attorney, Agent, or Firm*—Westerman, Hattori, Daniels & Adrian, LLP.

(57) ABSTRACT

This invention provides a method for suitably using a method for collectively receiving at a high voltage and distributing at a low voltage in collective housing. In this method for collectively receiving at a high voltage and distributing at a low voltage to a plurality of users, a distribution control part for collectively receiving power and distributing the power at a low voltage includes a server 12 and a control device 131 for controlling information on power consumed by the users. The control device 131 and the server are connected via a network. The server 12 grasps a maximum current capacity necessary for each user, determines a contracted current depending on the grasped maximum current capacity, and distributes power to each user.

5 Claims, 10 Drawing Sheets

METHOD FOR COLLECTIVELY RECEIVING AT HIGH VOLTAGE AND DISTRIBUTING AT LOW VOLTAGE, AND COLLECTIVE HOUSING USING SAME

BACKGROUND OF THE INVENTION

1. Field of the invention

This invention relates to a method for collectively receiving at a high voltage and distributing at a low voltage, and collective housing using the same, which is capable of suitably distributing power by considering power consumption changes in each household.

2. Description of Prior Art

In collective housing such as apartments, generally each household makes a usage based electricity contract with an electric power company and is supplied low voltage electricity (for example 200 V, 100 V). This is referred as a method for individually receiving at a low voltage. On the other hand, there is a method for receiving electricity at a high voltage by an electricity contract for industry (for example 6000 V) and distributing and supplying electricity at a low voltage (for example 200 V, 100 V) to each household. It is referred as a method for collectively receiving at a high voltage and distributing at a low voltage. Following is a difference between the method for individually receiving at a low voltage and the method for collectively receiving at a high voltage and distributing at a low voltage.

FIG. 1 is a schematic view illustrating an example of power supply to a detached house. Power at a low voltage (100 V or 200 V) is distributed from an electric power company through a power system 200 to a household 201 via a current limiter (referred as a breaker hereinafter).

Power is distributed not through a breaker in some contracts. However, it depends on an electric power company whether a breaker is equipped or not. Following explanation is in the case that the breaker is equipped.

A contract for supplying electricity to a detached house at a low voltage is referred as an electricity contract. In this case, a voltage is constantly 100 V, and a contracted power capacity is expressed by a current value, referred as a contracted current. The contracted current is determined on the basis of a maximum demanded current.

The maximum demanded current is a maximum volume of a demanded current consumed in a certain period in a certain area. In the example of FIG. 1, it is determined by a total current necessary for using loads (such as a television, air conditioner, rice cooker, washing machine, and refrigerator) in a household simultaneously. The household makes a contract of a contracted current, which satisfies a maximum demanded electric current, with an electric power company, and a breaker for controlling the contracted current is provided by the electric power company. A maximum current capacity is a maximum value of power enabling the household to use under the contract within a range of the contracted electric current, and is equivalent to a contracted electric current in the above mentioned electricity contract.

FIG. 2 is a schematic view illustrating an example of power distribution by using the method of collectively receiving at a high voltage and distributing at a low voltage in collective housing such as apartments or a group of detached houses. Power at a high voltage for example 6000 V is collectively received by a power distribution device 300 from an electric power company, and is distributed from the power distribution device 300 to each household 13a . . . at a low voltage for example 100 or 200 V. A base rate is determined on the basis of the contracted current in a usage-based electricity contract. On the other hand, a base rate in a power contract for industry is determined on the basis of a contracted power. The contracted power is determined on the basis of a maximum demanded power which a user can consume at one time under a contract (referred as a maximum power capacity hereinafter). In an actual case, the maximum demanded power in the past twelve months is a contracted power.

FIG. 3 is a schematic view illustrating an example of an electrical structure of the method for collectively receiving at a high voltage and distributing at a low voltage. The power distribution device 300 includes a high voltage trance 300a, a high voltage ac load switch 300b and so on. The power distribution device 300 distributes power at a low voltage (100 or 200 V) to each household 13a . . . through a breaker 130. A total contracted capacity of such the collective housing is not always equal to a value obtained by multiplying a maximum capacity per household by the number of households, because it is not likely that all the households use electricity at maximum at the same time. Thus, a concept of a demand factor is employed. A total contracted power of the collective housing using the method for collectively receiving at a high voltage and distributing at a low voltage can be expressed as follow.

Contracted power of all the households in the collective housing (W)=maximum current capacity per household (for example 30A)×100 V×the number of households×demand factor(%)

The demand factor can be obtained from;

Demand factor (%)=maximum demanded power (kW)/ rated capacity of equipment Σ(kW)×100

The above demand factor is assumed to be 40% in the collective housing having more than 20 households from an empirical rule.

FIG. 4 is a diagram for comparing an amount of power used in a month and an electricity bill per household in introducing the method for collectively receiving at a high voltage and receiving at a low voltage and the method for individually receiving at a low voltage to the collective housing of 50 households in an area of the electric power company employing an ampere bill system (for example a bill system adopted by Tokyo Electric Power Company and Tohoku Electric Power Company). As shown in FIG. 4, a minimum charge in the method for individually receiving at a low voltage is smaller than the base rate in the method for collectively receiving at a high voltage and receiving at a low voltage. A base rate in the method for collectively receiving at a high voltage and receiving at a low voltage becomes small as a contracted current is small. In the cases 1 and 2 in FIG. 4, the base rates are approximately 2000 yen and 1300 yen respectively.

An electricity bill in total is a sum of a base rate (or a minimum charge) and usage based charge in both cases. It is noted that a unit charge per kWh in the usage based charge is larger in the method for individually receiving at a low voltage. In addition, in the bill system of the method for individually receiving at a low voltage, a unit charge in the usage-based charge system increases when an amount of power consumed exceeds a certain level.

In the method for collectively receiving at a high voltage and distributing at a low voltage, a unit charge per kWh is smaller than that in the method for individually receiving at a low voltage, and even when a consumed power amount increases, a unit charge does not change as not like in the case of the method for individually receiving at a low voltage.

As shown in FIG. 4, electricity bills per household in the method for collectively receiving at a high voltage and distributing at a low voltage (Case 1) and the method for individually receiving at a low voltage are coincident at the A point, which is a breakeven point. A amount of electricity consumed in an average household is on the B point, at which an electricity bill increases in the method for individually receiving at a low voltage, rather than the A point, thus the method for collectively receiving at a high voltage and distributing at a low voltage is more economical. In the case 1, a difference in bills is 1,231 yen.

Then, the contracted current per household in the method for collectively receiving at a high voltage and receiving at a low voltage reduces from 30 A (the Case 1) to 20 A (Case 2). The breakeven point shifts from the A point to the A' point. Because the B point does not change, a difference in bill between these methods further increases.

As described above, as long as the amount of power consumed in a month is not smaller than an amount at the breakeven point, an electricity bill charged in the method for collectively received at a high voltage and distributing at a low voltage is more economical than the method for individually receiving at a low voltage. Therefore, in the collective housing, the method for collectively received at a high voltage and distributing at a low voltage has an advantage in terms of an electricity bill than the method for individually receiving at a low voltage.

In addition, the electricity bill can be reduced when a contracted electric current is smaller in the method for collectively received at a high voltage and distributing at a low voltage.

In the collective housing, however, a situation in using electricity and an amount of consumed power are different from each household. Thus, if a contracted current is made small for all the households, some of the households may have troubles in using electricity. Accordingly, a power contract with a sufficient contracted current is inevitable in an actual situation.

SUMMARY OF THE INVENTION

This invention was made to provide a method which enables each household in collective housing to effectively utilize the method for collectively receiving at a high voltage and receiving at a low voltage.

A method for collectively receiving at a high voltage and distributing at a low voltage according to this invention comprises collectively receiving power at a high voltage and distributing at a low voltage to a plurality of users, grasping a maximum current capacity necessary for each of the users, determining a contracted current for each of the users depending on the maximum current capacity, and distributing power to each of the users.

An excessive current capacity which is not necessary for one user can be allocated to another user who need the excessive current capacity in this invention. A part of the contracted current can be allocated from one user (whose a maximum necessary current is less than the contracted current) to another user (whose maximum necessary current is larger than the present contracted current). "A part of the contracted current" is referred to as a current capacity in the description of this invention.

Each of the users makes a request for his necessary current capacity, a current capacity based on the request is allocated to each of the users, and the contracted current to be distributed to each of the users is changed.

When a total current capacity requested by each of the users is larger than a total contracted current to be distributed, a user who can have an additional current capacity is determined by an auction.

Each of the users is charged a penalty when a current actually used exceeds the contracted current allocated to each of the users.

A collective housing using a method for collectively receiving at a high voltage and distributing at a low voltage comprises a distribution part for collectively receiving at a high voltage and distributing at a low voltage and a server for controlling a distribution status of each of users, and the server and each of the users are connected via a network, the server determines a contracted current for each of the users on the basis of information on each of the users supplied to the server and distributes power to each of the user.

A control device for controlling and displaying information on power consumed by each of the users is provided the collective housing, and the control device and the server are connected via the network.

A current limiter is provided to each of the users, and the current limiter is controlled on the basis of information from the server.

An excessive current capacity which is not necessary for one user is given to the server, information on another user willing to increase a contracted current is given to the server, and the excessive current capacity is allocated to the another user on the basis of the information.

Information on a maximum current capacity required by each of the users is given to the server, and the server determines the contracted current of each of the users on the basis of the information and distributes the power to each user.

The server determines a user who can have an additional current capacity on the basis of auction information supplied from each of the users when a total current capacity requested by each of the users is larger than a total contracted current to be distributed.

With the above mentioned system and structure, a maximum current capacity used in each of the users can be easily and appropriately allocated. Introduction of the system which is advantageous for a household with smaller contracted current can reduce a maximum current capacity of the whole collective housing, resulting in a less expensive base rate.

Figure 1:
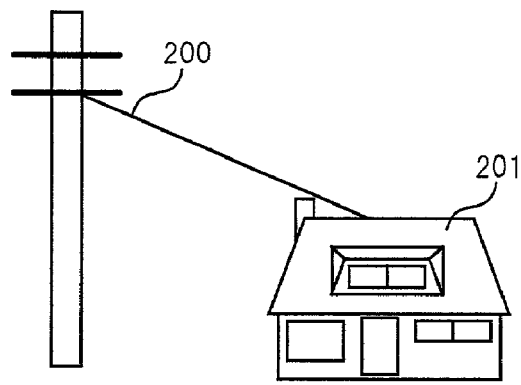
FIG. 1 is a schematic view illustrating an example of power supply to a detached house.
Figure 2:
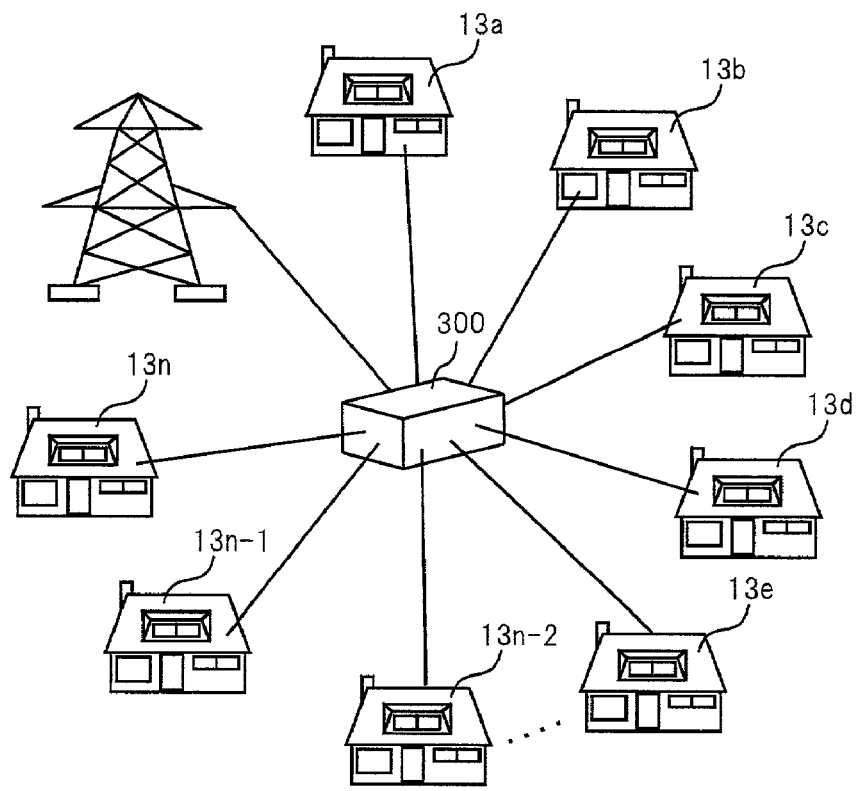
FIG. 2 is a schematic view illustrating an example of power distribution by using the method for collectively receiving at a high voltage and distributing at a low voltage in collective housing such as an apartment or a group of a plurality of detached houses.
Figure 3:
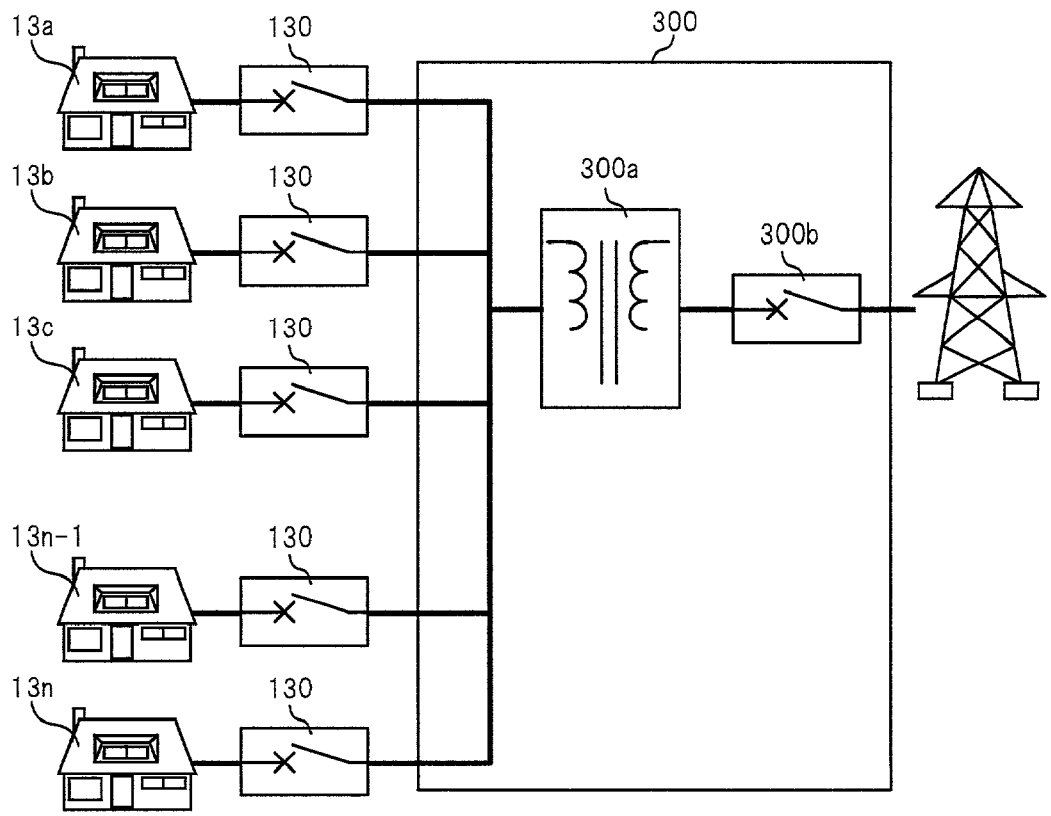
FIG. 3 is a schematic view illustrating an example of an electrical structure of the method for collectively receiving at a high voltage and distributing at a low voltage.
Figure 4:
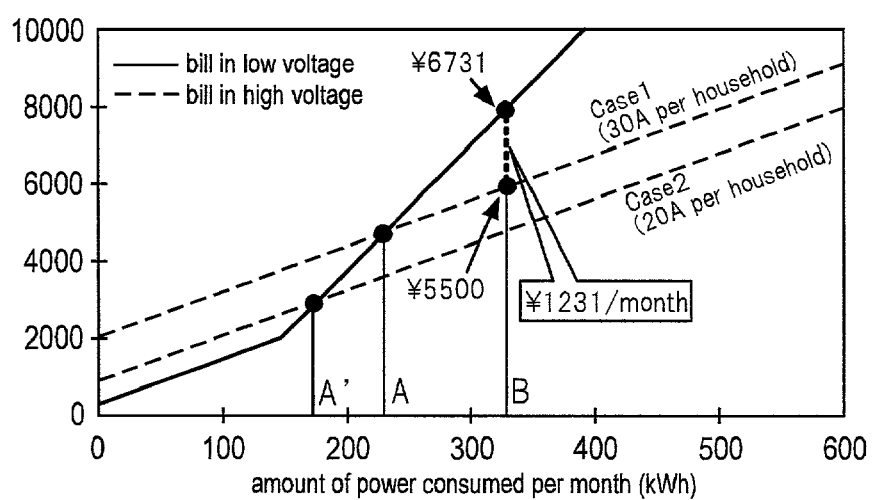
FIG. 4 is a diagram for comparing an amount of power used in a month and an electricity bill per household in introducing the method for collectively receiving at a high voltage and receiving at a low voltage and the method for individually receiving at low voltage to the collective housing of 50 households in an area of the electric power company employing an minimum charge system

The foregoing and other objects, features, aspects and advantages of the present invention will become more apparent from the following detailed description of the present invention when reviewed in conjunction with the accompanying drawings.

DESCRIPTION OF PREFERRED EMBODIMENT(S)

Explanation is made on embodiments of this invention by referring to the drawings. As described above, in the method for collectively receiving at a high voltage and receiving at a low voltage, when a contracted current used by each household is appropriately distributed depending on a maximum demanded current of each household, a total amount of contracted current of the whole collective housing can be reduced, resulting in a small base rate under a power contract with the electric power company. In order to appropriately distribute a contracted current for each of the households, a system is required, which a household having an excessive current capacity can supply the excessive current capacity to a user requiring a larger current.

This invention adopts a variable contract capacity system for effectively using an excessive current capacity in the method for collectively receiving at a high voltage and distributing at a low voltage. The variable contract capacity system can reset a contracted current into a desired one for each household in the collective housing, and the contracted current for each household is determined by demanding and supplying a current capacity within the collective housing.

Furthermore, a total contracted current of the collective housing can be small by devising a method for suppressing a contracted current for each household, and it brings about an advantage for a management company (or a resident's association).

Figure 5:
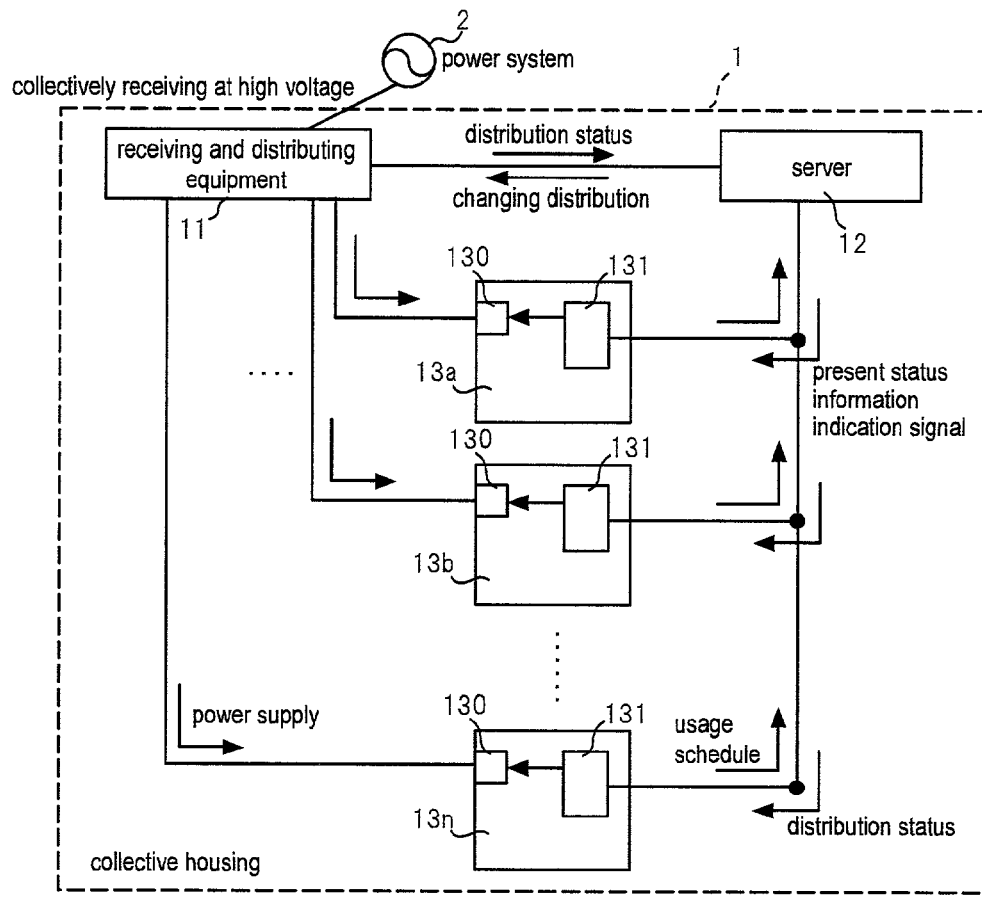
FIG. 5 is a block diagram illustrating an embodiment of a method according to this invention.

FIG. 5 is a block diagram illustrating a composition of the collective housing using the method according to this invention. In this case, the variable contract capacity system is applied.

In the system shown in FIG. 5, a contracted current etc. for each household is set by a server 12. As illustrated in FIG. 5, a high voltage power is collectively supplied to the collective housing from the power system 2. The power is supplied from the power system 2 to a receiving and distributing equipment 11, and is distributed by the receiving and distributing equipment 11 to each household. The power is supplied to each household 13a–13n through a breaker 130. Each household is equipped with a controller 131 as a terminal, and the controllers 131 and the server 12 are connected with LAN or the like to inform a usage schedule, a present status, a distribution status or the like. The breaker 130 changes a set current value at which the breaker 130 is tripped (referred as an over current value hereinafter) on the basis of an indication signal fed from the server 12 through the controller 131.

When the method for collectively receiving at a high voltage and distributing at a low voltage is employed, the collective housing is required to be in charge of reading a power meter, collecting an electricity bill, maintaining the power meter and so on by themselves. A management company or a resident's association should deal with such managements.

In this system, the controller 131 of each household 13a . . . is connected with the server 12. Information on an amount of power consumed in each household is fed from the controller 131 to the server 12, and the server 12 reads a power meter etc. Thus, the management company can obtain information from the server 12 and collect electricity bills.

Figure 6:
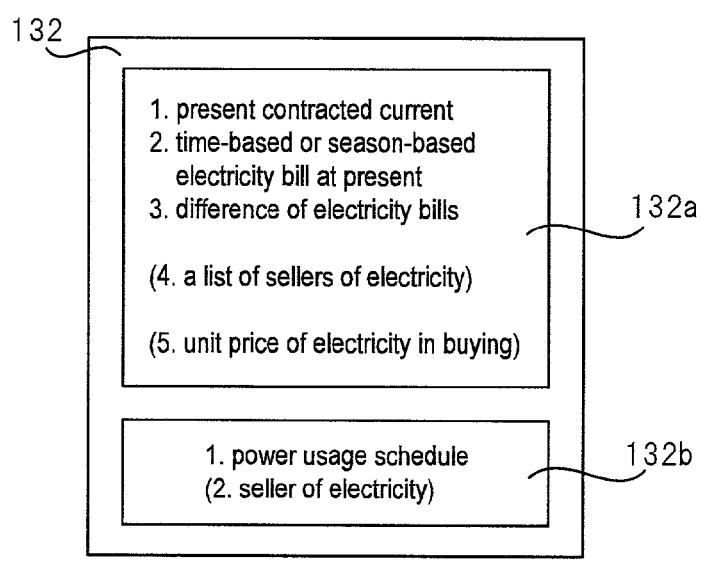
FIG. 6 is a schematic view illustrating a display of a monitor in each household.

The controller 131 may include a monitor 132 of such as a liquid crystal panel as shown in FIG. 6. The monitor 132 includes a display part 132a and an input part 132b of such as a touch panel. The display part 132a displays a present contracted current, a time-based or season-based electricity bill at the present time, a difference of the electricity bills, (a list of sellers of electricity), (a unit price of electricity in buying) and so on. Such the indications help in understanding what kind of selection is effective, and in saving power consumption. By referring to the information, a desirable style in consuming electricity can be informed of the server 12 through the input part 132b.

Items in parentheses of FIG. 6 will be displayed when power liberalization is realized in the future.

The input part 132b such as a touch panel is for inputting electricity usage schedule, (a seller of electricity) and so on. Each household inputs electricity usage schedule etc. by using the controller 131. In the above described variable contract capacity system, a current capacity to be traded etc. is also inputted from the input part 132b.

The server 12 determines what kind of contract system with an electric power company is best on the basis of information supplied from each household, and the result is sent to the controller 131 of each household 13a . . . , and is displayed on the monitor 132 through the controller 131. The households refer to the result and informs the server 12 of desired conditions again, and through several times feedbacks, the management company determines a contract system with the electric power company. Such the mechanism enables the management company to coordinate for the households 13a . . . and make a less expensive contract.

The server 12 directs the receiving and distributing equipment 11 to distribute electricity to each household on the basis of the contracted current of each household. The breaker 130 sets an over current value corresponding to the contracted current supplied by the server 12.

In order to change an over current value of the breaker 130, the breaker should be exchanged. However, it costs and is troublesome to replace the breaker 130 every time of changing a contracted current. In this system, the breaker 130 can change the over current value.

Figure 7:
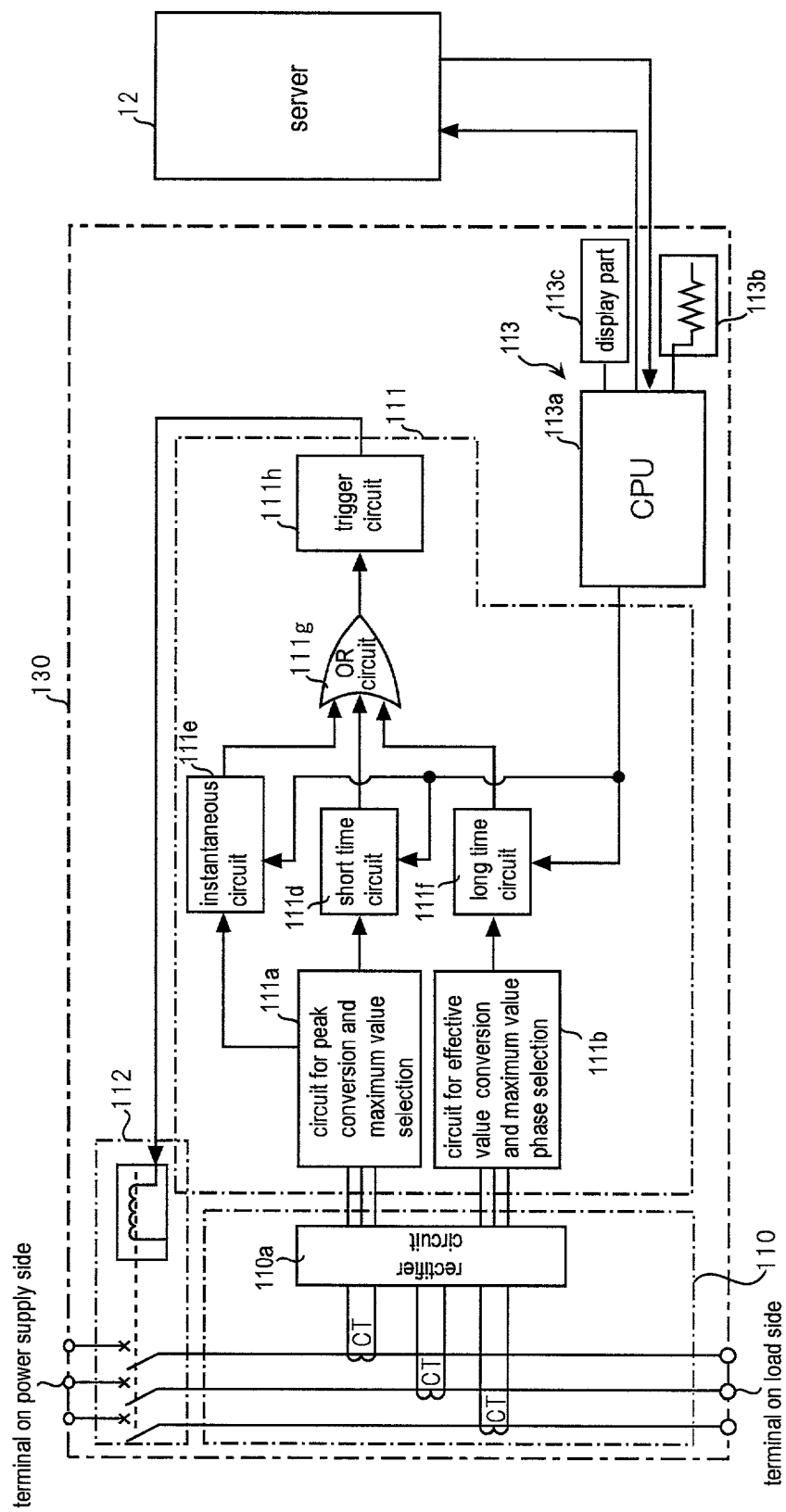
FIG. 7 is a block diagram illustrating a breaker suitable for this invention.

The breaker 130 can set a plurality of over current values in advance so as to change an over current value to be set. Although change of the over current value can be performed manually, the breaker 130 of this invention can change the over current value by an indication signal fed from the server 12. The breaker 130 of such the structure is illustrated in FIG. 7.

The breaker 130 includes a current detecting part 110 for detecting an electric current from an electricity wire, an interruption determining circuit 111 for determining interruption of the electricity wire on the basis of a signal from the electric current detecting part 110, an interrupting circuit 112 for interrupting electricity from the electricity wire by a trip signal fed from the interruption determining circuit, and a control circuit 113 for feeding a signal for changing the over current value to the interruption determining circuit 111.

The interruption determining circuit 111 includes an instantaneous circuit 111$e$, a short time circuit 111$d$, and a long time circuit 111$f$. An over current value is set in these respective circuits and the over current value is changeable in this invention. An electric current on a load side is detected between a terminal on a load side and a rectifier circuit 110$a$, and the value is fed to a circuit for peak conversion and maximum value selection 111$a$ and a circuit for effective value conversion and maximum phase selection 111$b$. An output from the circuit for peak conversion and maximum value selection 111$a$ is fed to the instantaneous circuit 111$e$ and the short time circuit 111$d$, and is compared with the over current value at these circuits. When the detected current value is large, a trigger signal is supplied to an OR circuit 111$g$.

A signal is fed to the long time circuit 111$f$ from the circuit for effective value conversion and maximum phase selection 111$b$, and is compared with the over current value at this circuit. When the detected current value is large, a trigger signal is fed to the OR circuit 111$g$. When any of signals is high (exceeds the over current value) at the OR circuit 111$g$, the OR circuit 111$g$ supplies an output to the trigger circuit 111$h$. As a result, the trigger circuit 111$h$ supplies an interruption signal to the trip circuit 112 when the signal is equivalent to the over current value, and the power from the electricity wire is interrupted by the trip circuit 112.

An indication signal of the over current value is supplied from a control circuit 113 including a CPU 113$a$ to the instantaneous circuit 111$e$, the short time circuit 111$d$, the long time circuit 111$f$. According to the indication signal, the over current values for the circuits (the instantaneous circuit 111$e$, the short time circuit 111$d$, the long time circuit 111$f$) are respectively changed. The CPU 113$a$ calculates over current values to be set for the circuits on the basis of indication from an operation part 113$b$ including such as a volume and an indication signal from the server 12, an indication signal corresponding to the calculated value is fed to the instantaneous circuit 111$e$, the short time circuit 111$d$, and the long time circuit 111$f$. These values to be set are displayed on the display part 113$c$.

Explanation is made on a breaker 130 of FIG. 7. When a load current flows to a terminal on a load side, a secondary current in proportion to the load current flows to a secondary side of a CT (a current trance). An alternating secondary current on the secondary side of each phase is rectified at a rectifying circuit 110$a$ and is outputted as a dc signal.

A dc signal of a maximum phase out of dc signals of every phase is selected. The circuit 111$b$ for effective value conversion and maximum phase selection 111$b$ selects and outputs a dc signal of an effective value of the largest phase out of the dc signals of every phase. The circuit for peak conversion and maximum value selection 111$a$ outputs a peak-converted dc signal of the maximum phase out of the dc signals of every phase.

In regions of a maximum phase instantaneous and short time, the peak-converted dc signal is a reference. In a long time region, the dc signal converted into an effective value is a reference. The dc signals are fed to the instantaneous circuit 111$e$, the short time circuit 111$d$, or the long time circuit 111$f$, and is compared with the over current value set at the instantaneous circuit 111$e$, the short time circuit 111$d$, or the long time circuit 111$f$. When the signal value exceeds the over current value, a trigger signal (high) for interruption after a predetermined period of time is outputted from the OR circuit 111$g$ to the trigger circuit 111$h$, and the trigger circuit 111$h$ is turned on. When the trigger circuit 111$h$ is on, an electric current from a moving coil flows into a trip coil of the trip circuit 112 to cut off the current.

The breaker 130 includes the control circuit 113, means such as the operation part 113$b$ for changing an over current value, and the display part 113$c$ for displaying an over current value. With this structure, a user can freely change the over current value which the breaker 130 interrupts the circuit. It is noted that when the server sets the over current value, the user can not set an over current value greater than that set by the operation part 113$b$.

Although the above described breaker 130 includes the control circuit 113, the controller 131 of each household can have a function of the control circuit.

In this case, the breaker 130 has a communication function and changes the over current value on the basis of a signal from the server 12 as a control center. The breaker 130 supplies a signal indicating an operation status of the current breaker, and the server 12 supplies data on the maximum current capacity to the breaker 130.

With this mechanism, each household 13$a$ . . . is equipped with a breaker 130 for operating at the maximum current capacity depending on the contracted current.

In order to use the variable contract capacity system, it is necessary to grasp the maximum current capacity actually required by each household. Currently, the maximum power capacity of the entire collective housing can not be changed until one year passes after the contract was made with the electricity power company. Thus, the one year is used for grasping the present situation of the amount of electricity to be used by each household.

A standard contract current, for example 30 A, is at first given to a household of the collective housing (or an apartment) using the method for collectively receiving at a high voltage and distributing at a low voltage. The server 12 allocates and distributes a standard contracted current to each household through the receiving and distributing equipment 11. The contract with the electric power company is made by a standard maximum power capacity at first, and for the first one year, the households individually grasp the maximum current capacity they use.

Each household 13$a$ gives information on an amount of power consumption from the controller 131 to the server 12 and the server 12 accumulates the power amount consumed by each household 13$a$ . . . The server 12 stores data on the amount of power consumed by each household at least for one year.

Users can access to the server 12 through the controller 131 in each household 13$a$ so as to read out their date and grasp the amount of power they consumed. It is more convenient to simulate the amount of power consumption by the controller 131. For example, when information on a load (an air conditioner, rice cooker, TV or the like) and the length of time of use are inputted, necessary maximum current capacity can be obtained and a contracted current can be assumed for determination. It is better to improve easiness of input operation so as to make the simulation easier. For example, the user inputs information such as on how many days he leaves home, from what time to what time he uses an air conditioner, a type of an electric appliance to be used, in a dialogue form displayed on the display part 132b to estimate an amount of power consumption and a necessary contracted current.

A base of the variable contract capacity system is made by grasping excess and deficiency in a maximum current capacity. And a system in which the contracted current for each household can be changed every predetermined period of time is established. The period can be determined by individual collective housing as every month, every three months, every half of a year etc.

A base rate for the whole collecting housing is divided to each household depending of their contracted current. The smaller the contracted current is, the smaller the base rate becomes. Therefore, incentives aiming to reduce the contracted current for the whole collective housing enables the users to be conscious of saving power consumption. For example, a unit price of a current capacity sold by each household is set to be more expensive than that of a current capacity originally possessed by each household, aiming to reduce a total contracted current.

Figure 8:
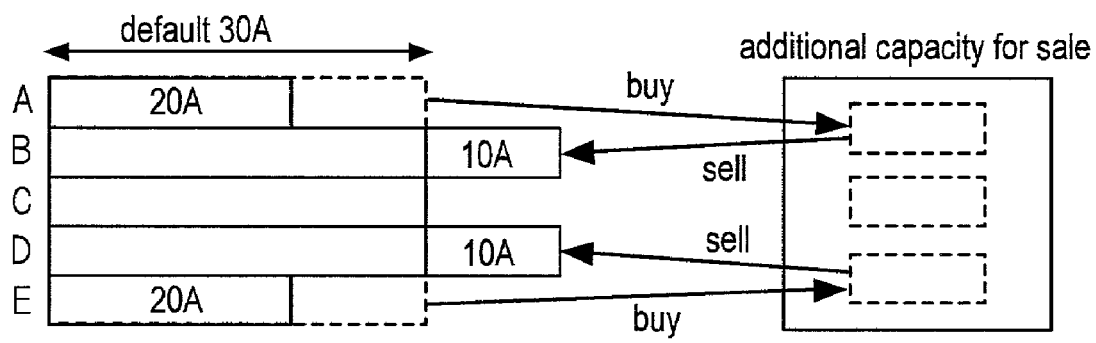
FIG. 8 is an explanatory view illustrating a specific example of a variable contract capacity system according to this invention.

Explanation is made on a specific example of the variable contract capacity system by referring to FIG. 8. A standard contracted current 30 A is given to each household. When reviewing the amount of power consumption of each household, it is found that a current 20 A is enough for the households A and E. Thus, the households A and E inform the management company (or the resident's association) of that they would like the management company to buy their excessive current capacity 10 A from the controller 131 to the server 12. In accordance with the request, the server directs to change the set of the breaker 130 so that the contracted current for the households A and E is 20 A. The breakers 130 of A and E set an over current value corresponding to the contracted current 20 A. The excessive current capacity purchased by the management company is registered in the server 12 as an additional capacity for sale. The management company notifies each household that the additional capacity is available. When the households B and D are willing to increase their contracted current, they notify it to the server 12 from the controller 131. When it is determined that the households B and D buy a current capacity 10 A respectively from the additional capacity registered by the management company, the server 12 directs to change the set of the breaker 130 so that a contracted current to be distributed to B and D is changed to 40 A. The breakers 130 of B and D set an over current value corresponding to the contracted current 40 A. A base rate for each household is determined depending on their respective contracted current. In transmitting a signal for changing set of the breaker 130 from the server 12, two routes are considered. When the controller is included in the breaker 130, the signal is transmitted from the server 12 to the breaker 130 through the receiving and distributing equipment 11. When the controller is not included in the breaker 130, the signal is transmitted from the server 12 to the breaker 130 through the controller 131.

In the example shown in FIG. 8, the desired contracted currents 20 A, 30 A, 40 A are distributed respectively to the household A and E, C, and B and D. When 30 A is a reference, C pays a standard base rate, A and E pay two-thirds of the standard base rate, and B and D pay four-thirds of the standard base rate.

When the additional capacity for sale corresponds to a request from an applicant household who is willing to buy the additional capacity, the base rate is merely distributed corresponding to the contracted current. When the capacity requested from the applicant household exceeds the additional capacity for sale, a buyer may be determined by an auction.

In addition, this system makes users be conscious of saving power consumption. For example, a unit price of a current capacity which is sold by a household is set to be more expensive than the unit price of the original current capacity. In the above example, the base rate for B and D who buy the additional current capacity is set more than four-thirds of the standard base rate.

If most of the households are willing to sell their excessive current capacity, the contracted current as the whole collective housing can be reduced by changing the condition of the contract with the electric power company.

Figure 9:
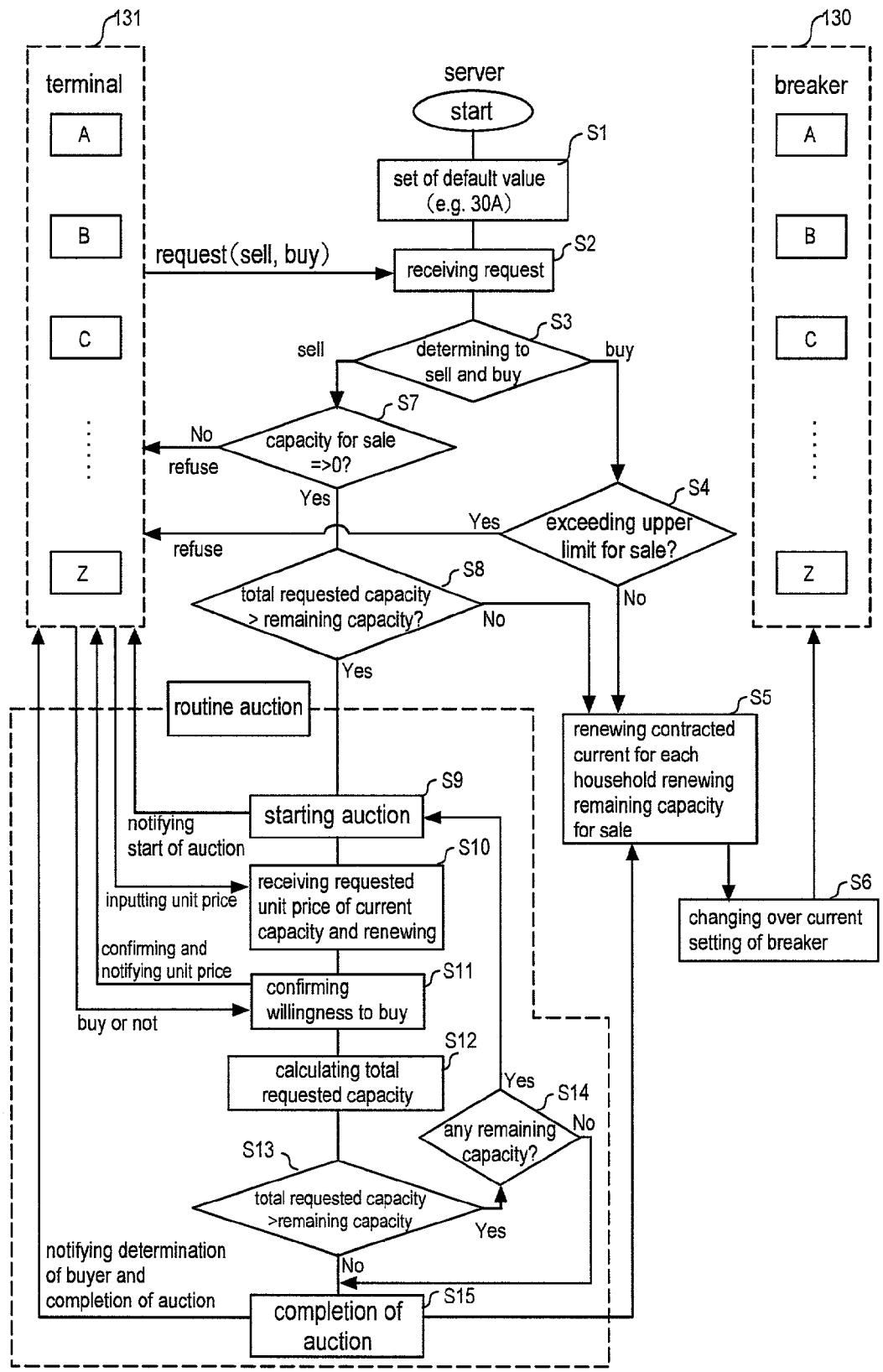
FIG. 9 is a flow chart for explaining an operation shown in FIG. 8.

Explanation is made on the above system by referring to a flowchart based on control by the server of FIG. 9.

The server 12 gives a contracted current 30 A, as a standard (default), to each household at first (the step S1). Then, the server 12 receives a request for sale or buy of an excessive current capacity from the controller 131 as a terminal of each household (the step S2). The server 12 determines whether the request from the controller 131 of each household is about for sale or buying of the excessive current capacity (the step S3). Buying means that the management company buys the excessive current capacity from a household, and sale means that the management company sells a current capacity to a household.

When the terminal 131 requests the management company to buy an excessive current capacity, the server 12 determines whether the excessive capacity is within a predetermined limit of sale (the step S4). An upper limit of a capacity for sale prevents great loss on a side of the management company when a total current capacity of the households becomes far smaller than the contracted current capacity which is collectively received. When such the upper limit is set, there are various methods for accepting the request for sale from each household. For example, there are a method of accepting requests within a range of a possible capacity for sale on a first-come-first-served basis, a method for accepting requests for a certain period of time and, when the requests exceeds the limit of possible capacity for sale, determining the households which can sell their extra capacity under a lottery system or an auction.

When the requests for sale is within the range of capacity for sale, an available capacity is set in the server 12 and the contracted current of the household requesting for sale is reduced and is updated into a new one (the step S5). Then, the server 12 notifies the breaker 130 to change an over current value set (the step S6). The breaker 130 of each household sets a new over current value according to the notification from the server 12. In the example of FIG. 8, the controllers 131 of the households A and E notify the server 12 to accept the requests for sale of excessive current capacity 10 A by the management company (or the resident's association) of the collective housing. In accordance with this notification, the server 12 directs the breaker 130 to change the contracted current of the households A and E to 20 A when the available capacity for sale does not exceed the upper limit, and a new over current value of the breaker 130 is set. The excessive current capacity bought by the management company is registered as an additional current capacity for sale in the server 12. When the available capacity for sale is beyond the upper limit, the server 12 notifies the controller of the household requesting for sale that there is no current capacity which will be bought by the management company.

As shown in FIG. 8, the households B and D which run short of the maximum current capacity notify the management company from the controller 131 through the server 12 that they would like to buy an additional current capacity. When the server 12 receives the request for buy (the step S3), the server 12 determines whether there is an available capacity for sale registered in the server 12 (the step S7), and notifies the controller of the requesting household that there is no available current capacity when there is no available current capacity. When there is an available current capacity, the server 12 compares a total capacity requested to buy with a remaining available capacity (the step S8). When the remaining capacity is larger than the total capacity requested to buy, the contracted current of the household is changed to a new one (the step S5). Then, the server 12 notifies the breaker 130 of the household to change set of the over current value corresponding to the renewed contracted current (the step S6). In accordance with this notification, an over current value of the breaker 130 of each household is changed into a new one corresponding to the new contract current notified from the server 12. In the example of FIG. 8, B and D buy the capacity 10 A registered as an available capacity for sale from the management company (or the resident's association) of the collective housing. The server 12 changes set of an over current value of the breaker 130 corresponding to the new contracted current so as to correspond to the contracted current 40 A to be distributed to B and D.

When the total capacity requested to buy is larger than the remaining capacity, an auction starts routinely. The server 12 notifies the applicant households to have an auction (the step S9). When the auction starts, the applicant households notify their desired buying unit price to the server 12. The server 12 receives the unit prices presented by the applicants and renew the buying unit price (the step S10). Then, the server 12 allocates the available current capacity to the applicants who presented the highest buying price, and inquires the applicants whether they are willing to buy or not (the step S11).

The applicant households notify to the server 12 whether they are willing to buy or not. The server 12 allocates the available current capacity to the applicants on the basis of the information from the applicants, and a total capacity requested from the applicant households is calculated (the step S12). Then, when the total capacity requested by the applicant households is larger than the remaining available capacity, the server determines whether any remaining capacity exists (the step S14). When a remaining capacity exists, the procedure returns to the step S9 to start the auction again. When the total capacity requested by the applicants is smaller than the remaining capacity or the remaining capacity runs out, the auction finishes (the step S15). Then, the server 12 notifies each applicant household that the buyer is determined and the auction is finished, and increases the contracted current of the buyer determined in the auction to update to the new contracted current (the step S5). Then, the server 12 notifies to the breaker 130 of the buyer household to change the over current value corresponding to the new contracted current (the step S6). The breaker 130 of the buyer household sets the new over current value notified from the server 12.

Figure 10:
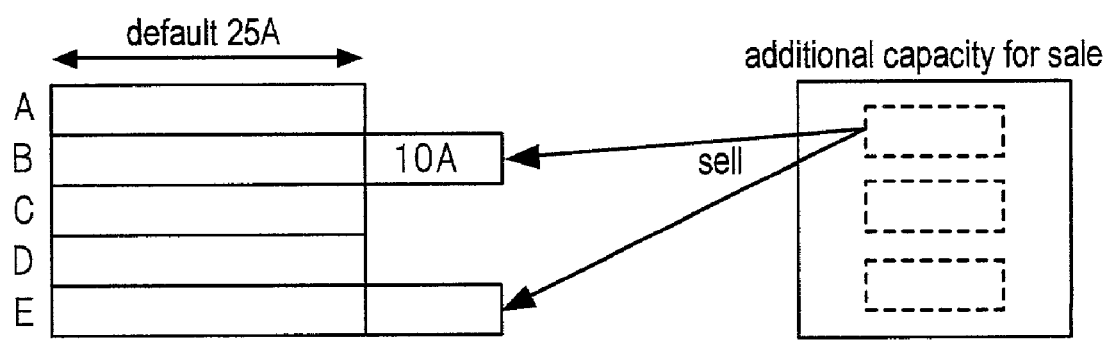
FIG. 10 is an explanatory view illustrating another specific example of the variable contract capacity system according to this invention.

Explanation is made on another example of the variable contract capacity system by referring to FIG. 10. A reference power capacity is set to be low in advance. In this example, 25 A is supplied to each household, and some current capacities are reserved by the management company as an additional capacity for sale. The management company notifies to each household that there is an additional capacity for sale.

In the example of FIG. 10, when the households B and E request the management company (or the resident's association) of the collective housing to add another current capacity 10 A, the B and E notify their request to the server 12 from the controller 131. When it is determined that the households B and E buy the current capacity 10 A from the additional capacity for sale registered by the management company, the server 12 sets an over current value of the breaker 130 corresponding to the new contracted current 35 A distributed to the household B and E. Then, the base rate for B and E is determined on the basis of the renewed contracted current.

When the number of applicant households is not more than the additional capacity for sale, the additional capacity is distributed. However when the number of applicant households exceeds the additional capacity for sale, a buyer is determined by an auction.

In order to make the households conscious of saving power consumption, a unit price of the additional current capacity is set high.

When the whole households little request to buy an additional capacity, the contract with the electric power company is changed to reduce the contracted power capacity of the collective housing.

Figure 11:
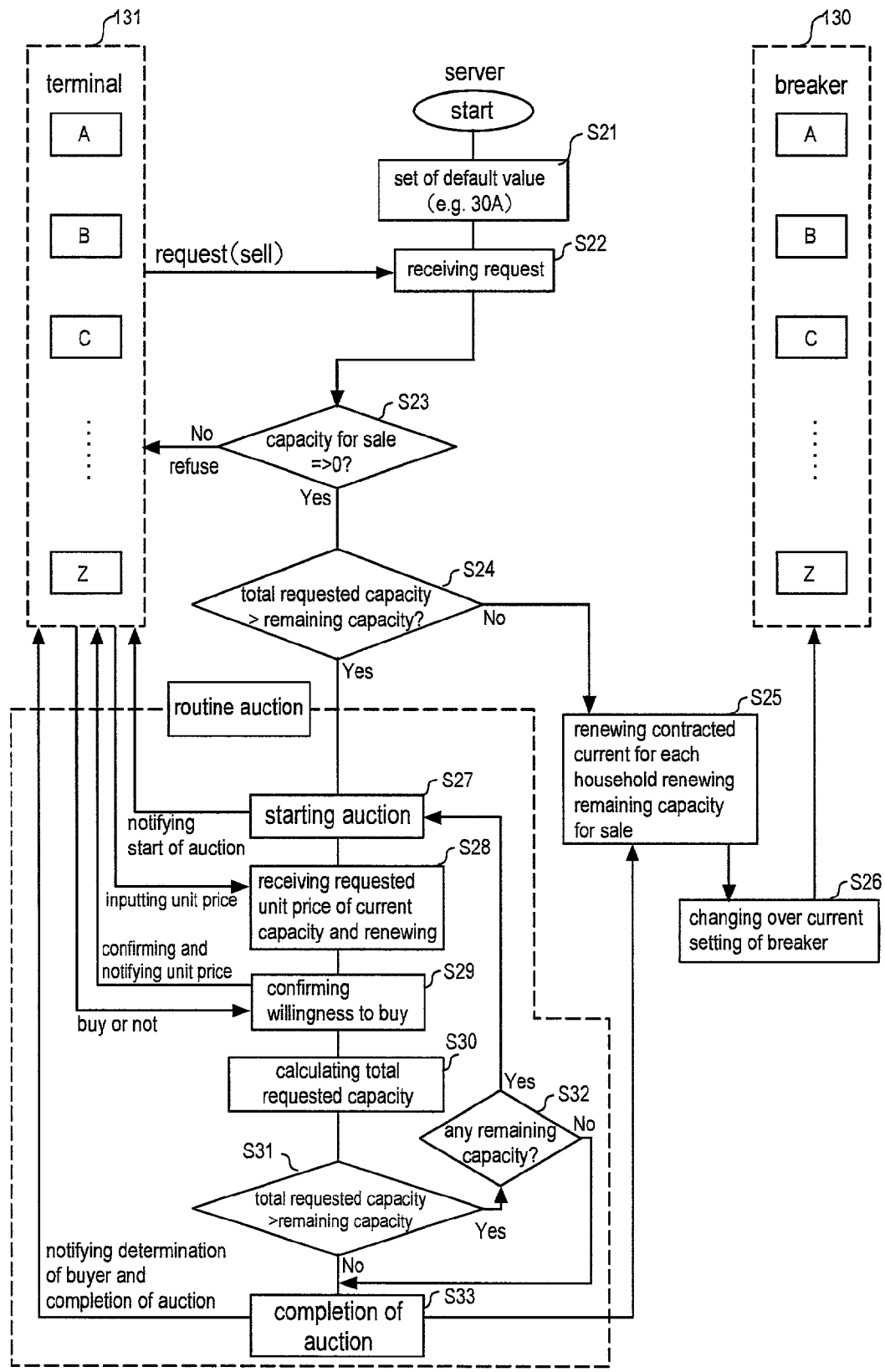
FIG. 11 is a flow chart for explaining an operation shown in FIG. 10.

Explanation is made on the above system by referring to a flow chart based on control by the server of FIG. 11.

The server 12 supplies 25 A to each household as a reference contracted current (a default) at first (the step S21). Then, the server 12 accepts a request to buy an additional current capacity from the controller 131 as a terminal in each household (the step S22).

As shown in the example of FIG. 10, the households B and E requesting for the additional current capacity notify to the server 12 through the controller 131 that they would like to buy the additional current capacity from the management company. When the server 12 receives the request for the additional current capacity (the step S22), it determines whether there is a capacity for sale registered in the server (the step S23). When there is no capacity for sale, the server 12 notifies to the controller 131 of the household that there is no capacity for sale. When there is a capacity for sale, the server 12 compares a total capacity requested and the capacity for sale (the step S24), and when the capacity for sale is larger than the total requested capacity, the server 12 increases the contracted current of the household requesting for the additional current capacity to change to a new contracted current (the step S25). Then, the server 12 notifies to change an over current value of the breaker 130 to correspond to the new contracted current (the step S26). The over current value of the breaker 130 is set to a new one. In the example of FIG. 10, the households B and E buy the current capacity 10 A regis capacity for sale from the management company (or the resident's association). The server 12 changes the over current value of the breaker 130 in order to correspond to the contracted current 35 A distributed to B and E.

When the total requested capacity is larger than the capacity for sale, an auction starts routinely. The server 12 notifies to the applicant households to have an auction (the step S27). When the auction starts, the applicant households notify their buying unit prices to the server 12. The server 12 accepts their buying unit prices of the current capacity for sale, and updates the unit price for sale. The current capacity for sale is allocated to the households presenting the highest unit price, and inquires whether the households are willing to buy or not (the step S29).

The households notify to the server 12 whether they are willing to buy or not. On the basis of these notifications, the server 12 allocates the current capacity to the households, and calculates a total capacity which the households request (the step S30). When the total requested capacity is larger than the available capacity, the server 12 determines whether there is a sufficient available capacity (the step S31). When there is still an available capacity, the procedure returns to the step S27 to restart the auction. When the total requested capacity is less than the available capacity, or there is no available capacity, the auction is closed (the step S33). Then, the server notifies to each household that the buyers are determined and the auction is closed, and the contracted current of the buyer determined at the auction is increased and is revised to a new one (the step S25). Then, the server 12 notifies to change an over current value set of the breaker 130 of each household (the step S26). The breaker of each household changes its over current value into a new one notified from the server 12.

Figure 12:
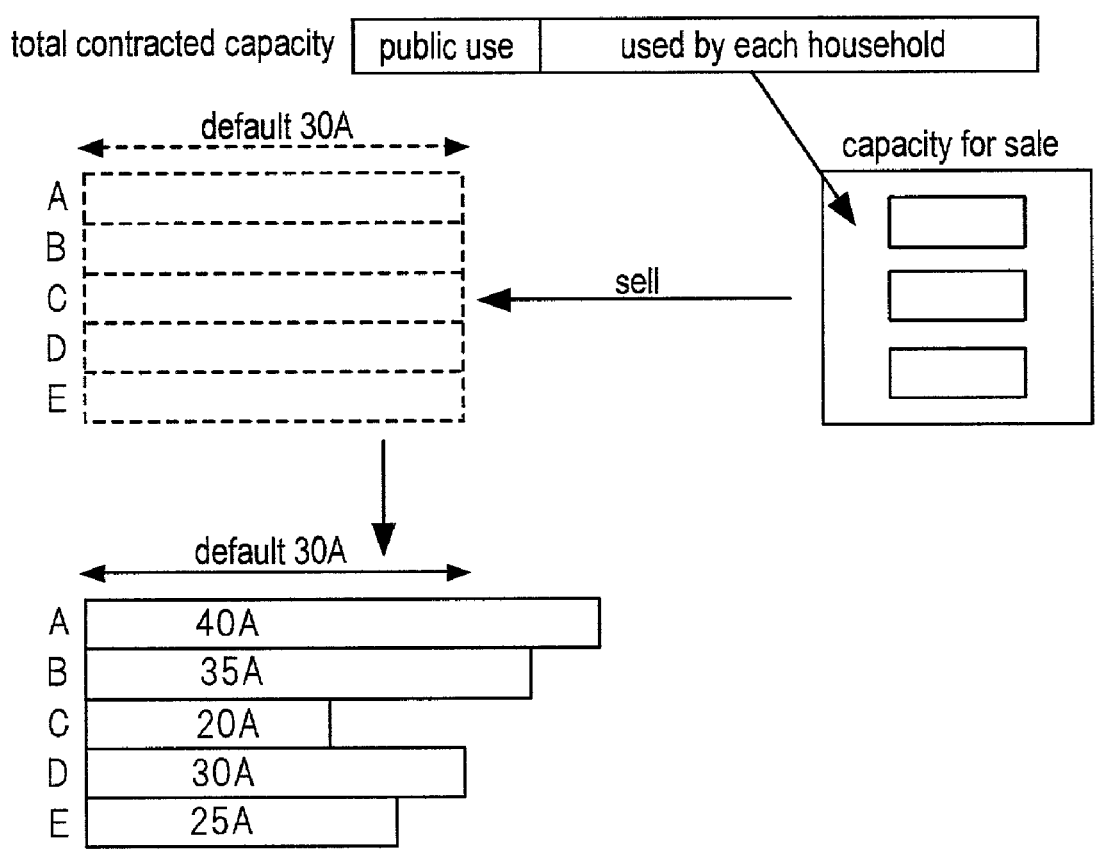
FIG. 12 is an explanatory view illustrating another specific example of the variable contract capacity system according to this invention.

Explanation is made on another example of the variable contract capacity system by referring to FIG. 12.

In this example, a current capacity except for of public use in the collective housing is reserved as a current capacity for sale. A contracted current for each household is at first zero, and each household presents request for desirable capacity. A base rate is determined and added weight depending on the contracted current. The desired contracted current is allocated to each household.

In this example, the contracted current of A is 40 A, B is 35 A, C is 20 A, D is 30 A, and E is 25 A.

The request from each household is sent from the controller 131 to the server 12. When the contracted current of each household is determined within the available capacity registered by the management company, the server sets an over current value of the breaker 130 depending on the new contracted current in accordance with this information.

When an additional current capacity for sale is smaller than the requested current capacity, a buyer is determined by an auction. A household who presents the highest price for a current capacity can obtain the desired current capacity. Such the complicated deal can be done easily between the controller 131 of each household and the server 12.

If an available capacity always remains, the contract with the electric power company can be changed into a less expensive one.

Figure 13:
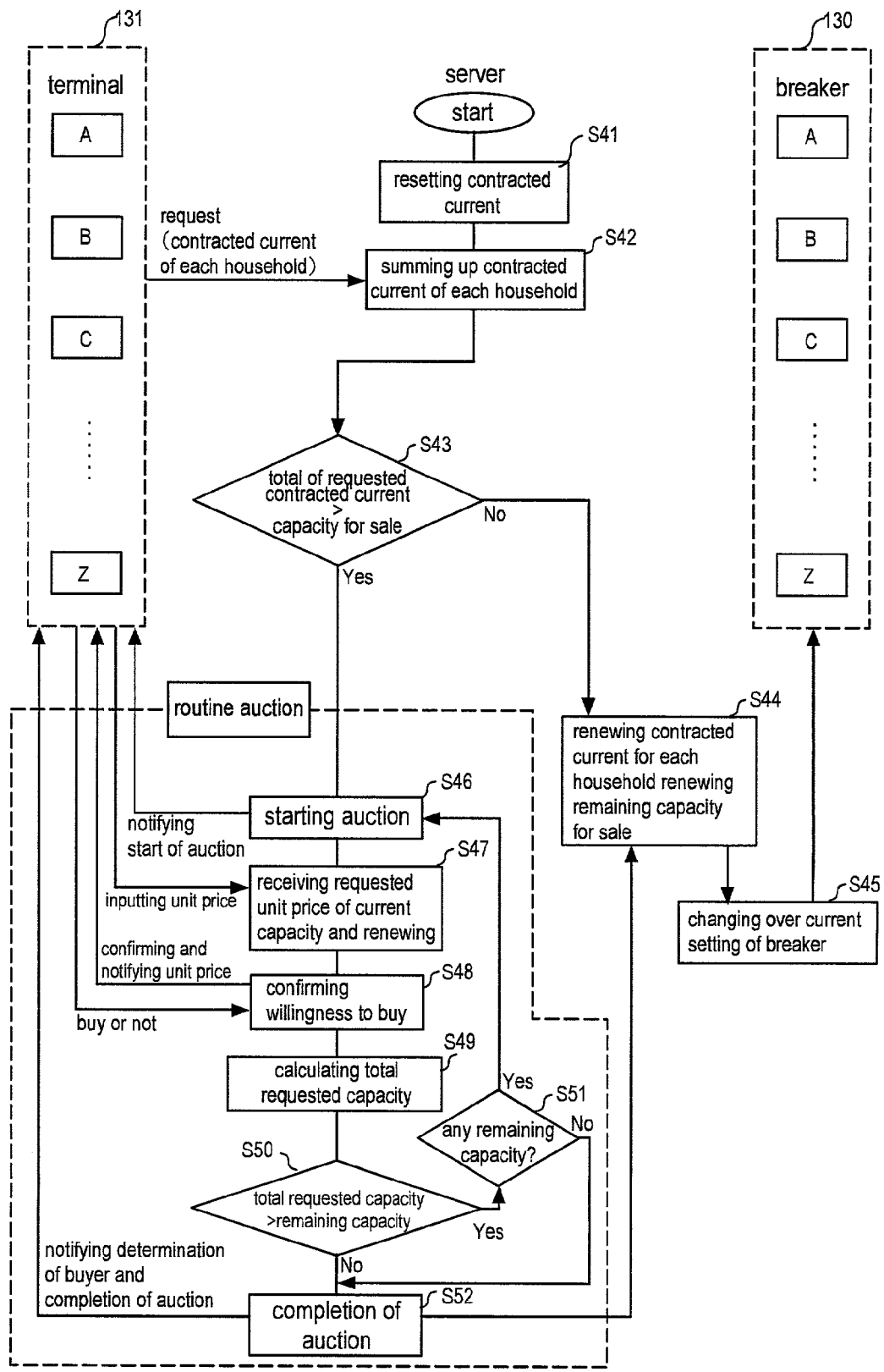
FIG. 13 is a flow chart for explaining an operation shown in FIG. 12.

Explanation is made on the above system by referring a flowchart based on control of a server shown in FIG. 13.

The server 12 resets the contracted current and accepts a desired contracted current from a start (the step S41). The server 12 accepts requests for buying a contracted current (sale of power) from the controller 131 as a terminal of each household, and sums up the requested contracted currents of the households (the step S42).

The server 12 compares an available capacity and a total requested contracted current (the step S43). When the available capacity for sale is larger than the total requested contracted current, the contracted current of each household is revised and a remaining quantity of the available capacity for sale is revised (the step S44). Then, the server 12 notifies to change the setting of an over current value of the breaker 130 of each household (the step 45). The breaker 130 of each household sets an over current value corresponding to the new contracted current notified from the server 12. The server 12 sets a new over current value of the breaker 130 to be 40 A for the household A, 35 A for B, 20 A for C, 30 A for D, and 25 A for E.

When the total requested contracted current is more than the available capacity for sale, an auction starts routinely. The server 12 notifies the applicant households to start an auction (the step S46). When the auction starts, the applicant households notify their desirable buying price to the server 12. The server 12 accepts the presented unit prices of the current capacity and revises it (the step S47). The server allocates a current capacity to the applicant households presenting the highest unit price, and inquires the applicant households whether they are willing to buy or not (the step S48).

The applicant households notify their willingness to buy or not to the server 12. The server 12 allocates a current capacity to the buyer on the basis of this information, and calculates a total capacity requested to buy by the households (the step S49). Then, when the total capacity requested is larger than the remaining capacity for sale, the server determines whether there is a remaining capacity (the step S51). When there is a remaining capacity, the procedure returns to the step S46 to restart the auction. When the total capacity requested to buy is less than the remaining capacity, or there is not remaining capacity, the auction finished (the step S52). Then, the server 12 notifies the determination of the buyers and the completion of the auction to each household, and revises the contracted current of the buyers into a new one (the step S44). The server 12 notifies to change the setting of the breaker 130 of each household (the step S45). The breaker 130 sets an over current value based on the new contracted current notified from the server 12.

In the above system, the over current value of the breaker 130 is set on the basis of the contracted current allocated to each household 13a. When the actual current value exceeds the over current value, the breaker 130 trips and distribution of power to the household stops. Other than that, a system which uses a non-variable breaker 130 and collects an additional charge when a current exceeds an allocated over current value is also applicable. In this way, a power failure caused by trip of the breaker can be prevented. The fact of exceeding the over current value can be easily grasped by the server 12.

In the above system, each household 13a is connected with the server 12 via a network, and information on an amount of power distributed to each household can be stored in the server 12. Thereby, the amount of consumed power can be easily checked without reading a meter. On the other hand, a conventional method requires to read a power meter equipped to each household to check the amount of consumed power used by each household. As a result, labor and cost for reading a meter can be reduced.

As described above, this invention realizes easy and appropriate distribution of power used by each household. Thereby, a contracted current of the whole collective housing can be reduced and a base rate becomes less expensive.

Although the present invention has been described and illustrated in detail, it should be clearly understood that the description discloses examples of different embodiments of the invention and is not intended to be limited to the examples or illustrations provided. Any changes or modifications within the spirit and scope of the present invention are intended to be included, the invention being limited only by the terms of the appended claims.

What is claimed is:

1. A method for collectively receiving power at a high voltage and distributing at a low voltage to a plurality of users, comprising:

collectively receiving power, at a receiving and distributing part, said power is purchased by a management company based on a purchase contract with an electric power company in consideration of the total amount of necessary power at a high voltage;

determining a maximum current capacity necessary for each of the users;

determining a current to be contracted for each of the users depending on the maximum current capacity;

setting an adjustable current limiter to said determined contract current for each of the users;

distributing said received power by said receiving and distributing part at a low voltage to each of the users;

receiving a request for a necessary current capacity from each of the users;

allocating a current capacity based on the request to each of the users;

changing the contracted current to be distributed to each of the users;

determining a user who adds a current capacity by an auction when a total requested current capacity is larger than a total contracted current to be distributed; and changing the setting of the current limiter for said user who adds depending on said determined additional current capacity.

2. The method for collectively receiving power at a high voltage and distributing at a low voltage to a plurality of users according to claim 1, wherein each of the users is charged a penalty when a current actually used exceeds the contracted current allocated to each of the users.

3. A collective housing for collectively receiving power at a high voltage and distributing at a low voltage to a plurality of users, comprising:

means for collectively receiving power, said receiving power which is purchased by a management company based on a purchase contract with an electric power company in consideration of the total amount of necessary power at a high voltage;

means for distributing said received power at a low voltage to each of the users;

a server configured to control a distribution status of each of users and determine a contracted current for each of the users on the basis of information on each of the users supplied to the server;

a control device configured to control and display information on power consumed by each of the users;

a current limiter provided to each of the users, the current limiter being set to the determined contracted current and controlled on the basis of information from the server;

a network for connecting said sever to said control device and to each of the user; and means for determining a user who adds a current capacity by an auction when a total reguested current capacity is larger than a total contracted current to be distributed and changing the setting of the current limiter for said user who adds depending on said determined additional current capacity.

4. The collective housing for collectively receiving power at a high voltage and distributing at a low voltage to a plurality of users according to claim 3, wherein said server is further configured to receive information regarding an excessive current capacity which is not necessary for one user, receive information on another user willing to increase a contracted current, and allocate the excessive current capacity to the another user on the basis of the information received at the server.

5. The collective housing for collectively receiving power at a high voltage and distributing at a low voltage to a plurality of users according to claim 3, wherein said server is conficiured to receive information regarding a maximum current capacity required by each of the users, determine the contracted current of each of the users on the basis of the information; and distribute the power to each user.

* * * * *